United States Patent [19]

Stoll

[11] Patent Number: 4,936,193
[45] Date of Patent: Jun. 26, 1990

[54] PROTECTIVE DEVICE

[75] Inventor: Kurt Stoll, Esslingen, Fed. Rep. of Germany

[73] Assignee: Festo KG, Esslingen, Fed. Rep. of Germany

[21] Appl. No.: 303,552

[22] Filed: Jan. 27, 1989

[30] Foreign Application Priority Data

Feb. 10, 1988 [DE] Fed. Rep. of Germany ....... 3803964

[51] Int. Cl.$^5$ .............................................. F01B 7/20
[52] U.S. Cl. .......................................... 92/51; 92/52; 92/53; 91/167 R; 91/167 A; 220/8; 384/15
[58] Field of Search ................. 92/52, 53, 65, 86, 150, 92/152, 167; 220/8; 384/15, 35; 277/DIG. 4, DIG. 8; 138/148, 151

[56] References Cited

U.S. PATENT DOCUMENTS

| 4,449,724 | 5/1984 | Ahn ........................................ 220/8 |
| 4,522,246 | 6/1985 | Bierbrauer ............................ 384/15 |

FOREIGN PATENT DOCUMENTS

| 158214 | 1/1983 | Fed. Rep. of Germany ........ 384/35 |
| 55-40188 | 3/1980 | Japan ................................... 271/189 |
| 1174065 | 12/1969 | United Kingdom .................. 384/35 |

OTHER PUBLICATIONS

V. M. Shults, "Improving Slideway Protection Devices", Stankii Instrument, vol. 45, Issue 5, 1974, pp. 17-18, (Machines & Tooling) Publication.

Primary Examiner—Robert E. Garrett
Assistant Examiner—F. H. Stephan
Attorney, Agent, or Firm—McGlew & Tuttle

[57] ABSTRACT

The present invention provides a protective device for a working member, such as the piston rod of a piston and cylinder actuator, which is arranged at least partly in a receiving member and is able to be moved and more especially slid, along a curved or straight path so that it projects to a greater or lesser extent out of the receiving member. The device is provided with a plurality of sleeve-like guard sections which surround the working member projecting out of the receiving member along the full length of the working member so that whatever the position of the latter any two adjacent guard sections overlap each other and are able to be slid in relation to each other, one of said guard sections being stationarily arranged on the receiving member and another guard section being arranged on the working member so as to move therewith so that in accordance with the actual axial extent of the part of the member to be protected the sections are telescoped into each other to a greater or lesser extent.

15 Claims, 2 Drawing Sheets

PROTECTIVE DEVICE

BACKGROUND OF THE INVENTION

The invention relates to a protective device for a working member, such as the piston rod of a piston and cylinder actuator, which is arranged at least partly in a receiving member and is able to be moved and more especially slid, along a curved or straight path so that it projects to a greater or lesser extent out of the receiving member.

A large number of devices of this sort have been proposed in the past, which have a working member slidingly mounted in a receiving member so as to be able to moved in translation by operation of the device and to project to a lesser or greater extent out of the receiving member.

Such devices are for instance piston and cylinder actuators, whose piston running in the cylinder is connected with a piston rod extending to the outside and is provided with a means for connecting it with a load. Also devices with a sliding sleeve such as the tailstock of a lathe, are designed in this manner and comprise a cylindrical part sliding in a housing and which is caused to move to a greater or lesser extent out of the housing by a lead screw or by a fluid operated device. All these forms of equipment have the common feature that the working parts, such as the part of the piston rod outside the cylinder, are fully exposed to the surroundings so that they are likely to become dirty or to be damaged. It is more particularly in applications in dirt-laden atmospheres, as for instance in the neighborhood of machine tools that particles of dirt, turnings and the like, become deposited on the moving parts and this then leads to damage to the exposed running surfaces and seals of the respective receiving member. The respective devices then have to be frequently replaced.

SHORT SUMMARY OF THE INVENTION

One object of the present invention is to create a protective or guard device for the moving working member which is simple in design and is able to adapt itself to each respective position of the working member.

In order to achieve these or other aims appearing from the present specification and claims, the protective device is provided with a plurality of sleeve-like guard sections which surround the working member projecting out of the receiving member along the full length of the working member so that whatever the position of the latter any two adjacent guard sections overlap each other and are able to be slid in :elation to each other, one of said guard sections being stationarily arranged on the receiving member and another guard section being arranged on the working member so as to move therewith so that in accordance with the actual axial extent of the part of the member to be protected the sections are telescoped into each other to a greater or lesser extent.

Thus the invention provides a guard device which comprises a plurality of cylindrical tubular sections, which surround the working member whatever its position around its full circumference. Since the respectively adjacent guard sections are able to be moved in relation to each other in the direction of motion of the working member and since furthermore a guard section is attached to the receiving member and another is attached to the working member, the protective device is able to adapt itself to the changing length of the part of the working member that is to be protected. As part of such adaptation the guard sections are telescoped into each other to accompany a reduction in the length of the part to be protected whereas in the event of there being and oppositely directed motion, the guard sections are telescoped in an outward direction. In every case a continuous wall is present, which completely surrounds the part of the moving member to be guarded with the result that soiling or damage from the outside is out of the question. Owing to the mobility of of the individual guard sections the protective device is very compact in design and its length is only large enough to meet essential requirements. As a result there is no projection of the guard past the working member when the latter is in its retracted state. Another feature is that the protective device makes it possible to adapt the guard sections to the design of the respective working member so that there is only a slight increase in overall size even in a direction perpendicular to line of motion of the working member. It is furthermore possible for pre-existing devices having movable working members to be equipped with the device in accordance with the invention without any trouble, same being readily able to be detached in case of need.

Advantageous further developments of the invention are described in the claims.

In accordance with one such further development the dimensions of the guard sections as measured in a direction across the direction of motion decrease from the guard section attached to the receiving member towards the guard section attached to the working member in such a manner that at the maximum length of the part to be protected by the protective device has an external form more particularly in the form of a stepped pyramid. This development of the invention offers the advantage that the transverse forces acting on the working member are negligible even when the working member extends far out of the receiving member, since the protective sections with larger dimensions and thus with a greater weight are arranged adjacent to the receiving member.

As part of a further development of the invention the individual guard sections essentially have a cylindrical tubular form and in particular have a circular cross section. This means that there is precise guiding and sliding action of the individual guard sections in relation to each other so that there is no danger of their running skew and there is an increase in operational reliability.

In accordance with a still further development of the invention the individual guard sections when telescoped into each other to form respective cooperating pairs of cooperating elements are provided each with an abutment and driving means. This ensures that there is no unintended disengagement of the guard sections.

It is possible for there to be a guide device adjacent to the axial end part of at least one guard section of each cooperating pair of telescoping sections so as to lead to a positively guided relatively sliding motion of the two guard sections such guide device being in the form of a tubular bushing which is arranged at the axial end part of the one guard section of the two sections overlapping each other and it has a radial peripheral surface forming a guide surface for guiding sliding motion of the other guard section. Furthermore the guide bushing which is arranged at the inner periphery of the respectively out guard section of a cooperating pair of such sections, surrounds the inner guard section with a radially inwardly directed peripheral surface so that there is a sliding play. These features ensure a guiding action of the individual guard sections so that they are large engaging surfaces. The guide bushing may be bonded to the guard section which carries it so that the process of manufacture is simplified. Such simplicity of manufacture is further enhanced if the guiding device is made of plastics material, such material considerably reducing the level of the noise caused by the friction.

Further developments are possible as defined in the originally filed claims 12 et seq. so that particularly economic production is possible, so that the individual guard sections, and thus the entire device, is stiffened.

A further development ensures a compact overall size, more especially in the retracted state of the working member.

The protective device in accordance with the invention may be used in conjunction with manner different forms of equipment which have a receiving member and a working member able to be moved, and more particularly slid, in relation to it. Preferred fields of application are piston and cylinder actuators, shock absorbers, welding cylinders, electric solenoid cylinders and sliding sleeve units. Furthermore, the protective device may also be used if the working member, like the protective device itself, is adapted to telescope and also comprises individual sections, which slide into each other to a greater or lesser extent during operation.

One working example of the invention will now be described with reference to the accompanying drawings.

LIST OF THE DIFFERENT VIEWS OF THE FIGURES

DETAILED ACCOUNT OF WORKING EMBODIMENTS OF THE INVENTION

Figure 1:
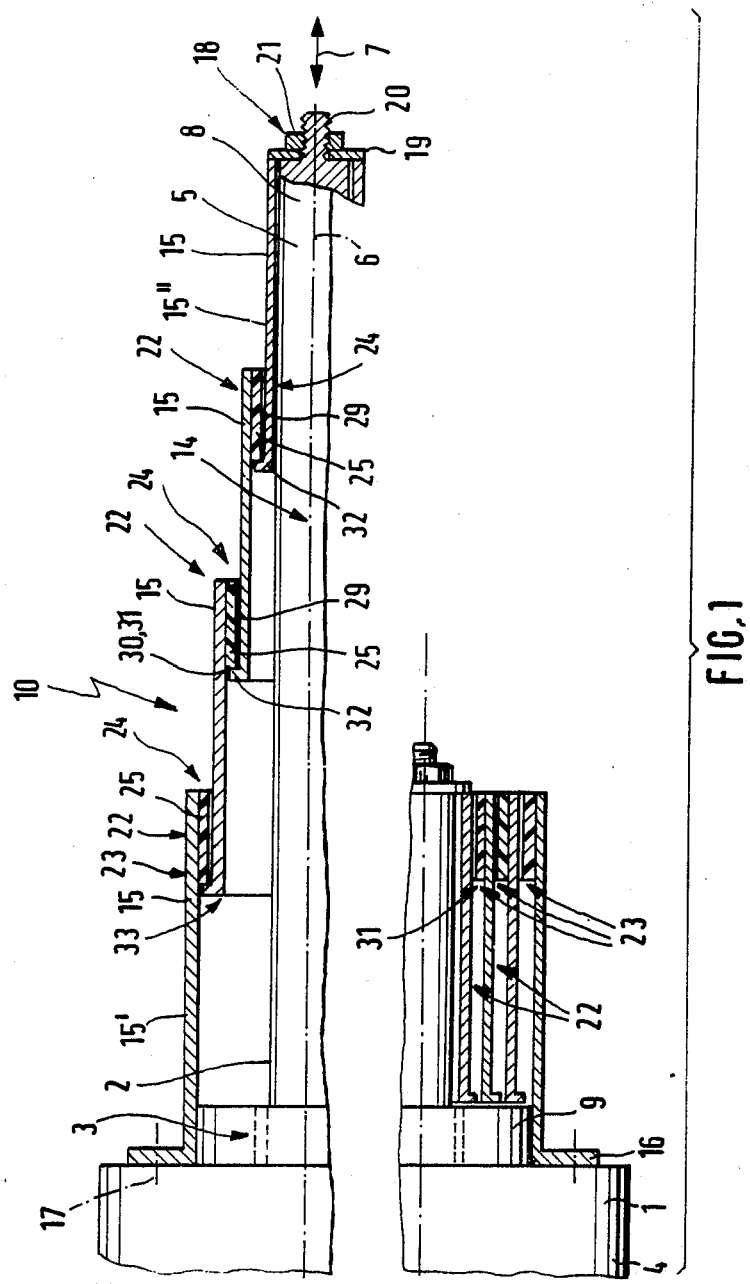
FIG. 1 shows a first constructional form of the protective device diagrammatically in a condition as fitted to a piston and cylinder unit, the cylinder of the unit only being shown in part; in the upper half of the figure the protective device is shown in the extended state and in the lower half it is shown in the retracted state.

The protective device of the invention serves to protect the movable working member of a device, which extends out of a receiving member to a greater or lesser extent in accordance with the state of operation so that such working and receiving members are protected against dirt or other forms of damage. In the case of devices used in conjunction with the protective device, it is usually a question of devices in which the working member is moved along a linear or curved path during operation as is the case for instance with shock absorbers, welding cylinders, solenoid cylinders, sliding sleeve units and the The description of the first embodiment of the protective device of the invention will be in connection with the protection of the piston rod of a piston and cylinder unit, although the application of the invention is not limited to such devices. In detail, FIG. 1 shows on the left the end part of a cylinder 1, only shown in part, in which there is a piston, not shown in detail, attached to a piston rod 2. The rod 2 extends through the end part of the cylinder with a seal therebetween towards the outside. The respective guiding and sealing arrangement 3 on the cylinder is only indicated in broken lines and is located in an annular axial prolongation 9 coaxial to the cylinder and having a smaller diameter than the cylinder. It is secured to the end of the cylinder 1 penetrated by the piston rod.

In the case of the piston and cylinder unit illustrated here the cylinder 1 forms the receiving member 4 and the piston rod 2 forms the working member 5, which is able to be slid or moved by suitable supply of fluid under pressure to the cylinder spaces, not shown, in the axial direction 6 as indicated by the double arrow 7 so that an operational part 8 of the rod extends to a greater or lesser extent out of the receiving member 4 and, respectively, the axial prolongation 9.

If the piston and cylinder is used in positions where it is exposed to relatively heavily contaminated air, it is possible for dirt particles or the like to become deposited on the part 8 so that when the piston rod 2 is moved inwards into the cylinder the guiding and sealing means may be damaged. If the unit is used in which loose articles are being handled, as for example in manufacturing equipment, there is the danger of the part 8 being damaged by abutting or falling articles. The protective device 10 in accordance with the invention prevents such damage inasmuch as it covers and protects the part 8 along a desired length thereof whatever the length of the part 8 is extending out of the receiving member. The part 14 of the working member 5 to be protected may be of any desired length and more especially it may be shorter than the respective part 8. In the case of the working example shown in FIG. 1 the part 14 to be protected is essentially the same in length as the part 8.

The protective device 10 comprises a number of cylindrical tubular guard sections 15. In the case of the present example there are four such sections 15, but dependent on the thickness and length of the working member 5, it is possible to provide more or indeed less guard sections. However, at least two sections are needed as a minimum. The guard sections 15 are preferably all arranged to be coaxial to the working member 5 and surround the same in the peripheral direction. One of the guard sections 15' has its one axial end part fixed to the end face of the cylinder 1 so that it is preferably slipped onto the axial prolongation 9 and is centered thereby. Furthermore, the guard section 15' has an annular radial collar 16 at the end part adjacent to the cylinder. This collar 16 rests on the cylinder and is screwed thereto by diagrammatically indicated screws 17 or attachment of the section 15'. It will be clear that a means of attachment would be possible as well, in which case the end part of the guard section 15' would have a different shape. The important point is that the guard section 15' is located fixedly in relation to the receiving member 4 during operation. Another guard section 15" is attached to the working member 5, that is to say at the end part of the working part 8 opposite to the cylinder 1, which in the present case is the end 18 of the piston rod. In the case of the simple type of attachment shown the one axial end of the guard section 15" is provided with an annular end plate 19, which may be welded on or attached integrally. It has a central aperture, which so that it may be slipped over the free end of the piston rod 2 and fitted on an axial threaded tailpiece 20 on the rod 2. The end part of the piston rod is thus surrounded by the guard section 15" which is like a cap. On the threaded tailpiece 20 there is also a nut 21, which holds the end plate 19 and thus the guard section 15" to the piston rod 2. It would be possible to have a connecting member joined to the threaded tailpiece 20 for connecting the unit with a load to be operated.

With respect to the attachment of the guard section 15" as well it may be observed that the method of attachment just described is very advantageous but that other forms of attachment are also feasible if they have the effect of causing the guard section 15" to be directly moved when the piston rod 2 is shifted.

The guard sections 15 of the protective device 10 all have a tubular form with a circular cross section, the diameter of the stationary guard section 15' being larger than that of the guard section 15" on the piston rod. The two other guard sections placed between the guard sections 15' and 15" also have different diameters so that they are able to be coaxially telescoped into each other, the external diameter of the guard section with the larger diameter being less than the internal diameter of the guard section 15' adjacent to the cylinder and the internal diameter o: the guard section having the smaller diameter being larger than the external diameter of the guard section 15" adjacent to the piston rod. It is in this manner that it is possible to ensure that all guard sections 15 are able to be coaxially moved into each other, said sections being concentric in relation to each other as seen in the axial direction 6.

At least the respectively adjacent guard setions are in overlapped relationship to each other whatever the position of the working member 5, such overlap 22 corresponding to at least a short distance along the direction 7 of motion of the member 5.

The manner of operation of the protective device 10 will now be described: if the working member 5 is in a position relatively far in the receiving member 4 in which the extent of the part 8 is relatively short, the guard sections 15 will be telescoped a relatively large amount into each other, as is indicated in FIG. 1 in the lower part. Since in this case the axial length of the of the individual guard sections is essentially the same in this setting the length of the protective device is essentially the same as the length of a guard section—apart from the attachment end of the guard section 15'—and all the four guard sections 15 are nested in each other and completely telescoped together so that adjacent to each outer guard section radially inward there is a coaxially arranged further guard section. If the piston and cylinder unit is then actuated with the consequence that the piston rod 2 is caused to protrude, the result is that the guard section 15" secured to it will be moved with it and will move in the axial direction from the guard section surrounding it. When this guard section has reached a certain position it will cooperate via an abutment and entraining device 23 with the guard section partly directly overlapping it so that the section 15 will also be moved in the axial direction 6 and will be drawn out of the guard section 15 surrounding it. The motion of the sections will then be continued in the same manner until all the other guard sections owing to the presence of the abutment and entraining devices 23 until in the end the position indicated in the top of the FIG. 1 is reached, in which the individual guard sections are drawn out of the sections surrounding them to the largest possible extent. In this respect the abutment and entraining device 23 at the same time prevents a complete drawing apart of the individual guard sections since it limits the axial extent of the guard device.

It is thus possible to ensure that the part 14 to be guarded of the part 5 is surrounded along its entire length whatever its setting, in the peripheral direction by the protective device, that is to say its guard sections, the adaptation to the length being made possible by the fact that the individual guard sections 15 are able to be telescoped into each other to a greater or lesser extent coaxially and practically constituting a telescoping boot.

The circularly cylindrical design of the guard sections leads to the advantage of a compact construction and to an approximate adaptation to the outer form, which is generally circular as well, of the cylinder 1 and of the piston rod 2. It will be clear that the cross section may be different, as for instance in the form of polygons, steps then having to be taken to see that individual guard sections are then able to be telescoped into each other.

In the case of the protruding state shown in the top part of FIG. 1 the protective device has assumed a form with a number of annular steps, the largest diameter of the stepped structure being at the cylinder 1 and the smallest dIameter beIng at the pIston rod. A reversed arrangement would however also be possible, although the first arrangement has more advantageous effects.

It will be clear that in the case of a protective device having only two guard sections an entraining device will not be required although an abutment means to prevent complete pulling apart of the sections is an advantage In this case as well.

In order to facilitate the relative motion of the individual guard sections 15 there is a guide means 24 between each cooperating pair of adjacent sections, which preferably is associated with the one axial end part of the one overlapping guard sections of which there are two. In the figure it is associated with the guard section having the larger diameter of a cooperating pair of guard sections and it is formed by a tubular guide bushing 25, which is arranged at the axial end part of the guard section 15 overlapping on the outside. In order to cheapen manufacture the guide bushing 25 is preferably plugged into the associated sleeve-like guard section 15 and its outer cylindrical periphery firmly engages the inner surface thereof. Attachment together may be by means of force fit or more preferably by bonding, this ensuring simple manufacture and a high strength. The radially inner peripheral face of the guide bushings forms a cylindrical guide face 29, which surrounds the outer periphery of the at least partly axially inserted adjacent guard section 15 with a sliding fit so that the individual guard sections running on each other on large surfaces and without any danger or running skew.

The individual guide bushings are more especially made of plastic material, this guaranteeing a high resistance to wear, and that on sliding the sections the noise produced is minimum.

The individual guard sections are themselves preferably made of stainless steel but they may be made of plastic material.

In FIG. 1 the guide device 24 is preferably a part of the abutment and entraining device 23. It does in fact form the edge 30, turned towards the end, which does not have any guide bushing and is turned towards the cylinder 1, of a respective guard section of respective guide bushing 25 so that there is an annular abutment 31, which cooperates with the abutment 32 arranged on the inserted end of the respective other guard section, such abutment 32 being formed by a peripheral radial step, which is here preferably in the form of an outwardly bent axial end part 33 of the respective inner guard section.

The guard sections placed between the two guard sections 15' and 15" thus more especially have the form of a tube, at whose one axial end part there is the internal guide bushing and whose opposite end part carries the radially outwardly projecting abutment 32 in the form of the bent over tube rim.

Figure 2:
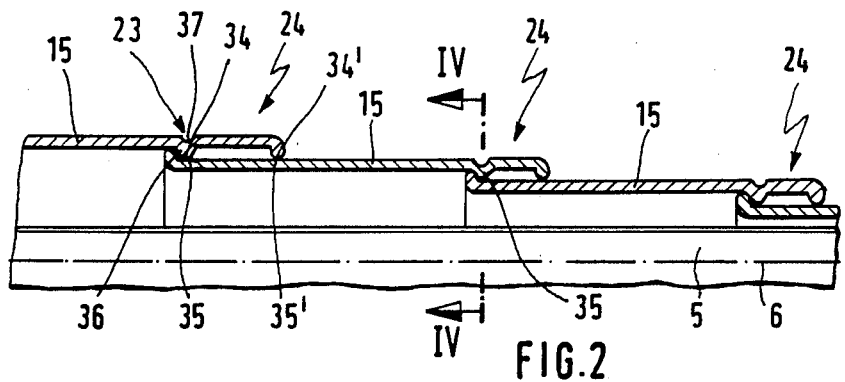
FIG. 2 shows a further possible form of the protective device in the case of which the receiving member is omitted and the working member is only shown in part, the view being a longitudinal section as was the case with FIG. 1.
Figure 4:
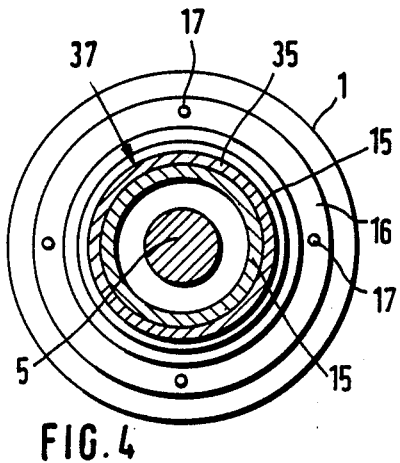
FIG. 4 shows a cross section through the protective device of FIG. 2 on a section line IV—IV.

The design shown in FIGS. 2 and 4 is generally the same as that already described although the guide device placed on the respectively outer following guard section surrounding the guard section is different. In the present case it comprises two guide parts 34 and 34', which are spaced and offset in the axial direction on the overlapping end part of the respective guard section 15, which are in the form of annular radial projections 35 and 35' surrounding the internal guard section. Accordingly the walls of directly inserted guard sections are spaced peripherally in the radial direction and it is only at the guide parts 34 and 34' that there is a running contact with a sliding fit, preferably the guide part 34' is formed by a radially inwardly bent end part of the guard section while the other guide section 34 is in the form of a groove 36, there being a corresponding depression 37 in the peripheral direction on the outer circumference. This groove 36 preferably at the same time forms the one abutment of the abutment and entraining device 23, which may cooperate with the one abutment formed on the adjacent guard section as in the design of FIG. 1.

Owing to the groove 36 the individual guard sections 15 additionally are stiffened and this endows the entire protective device with a high degree of resistance to flexure even in the extended condition.

Figure 3:
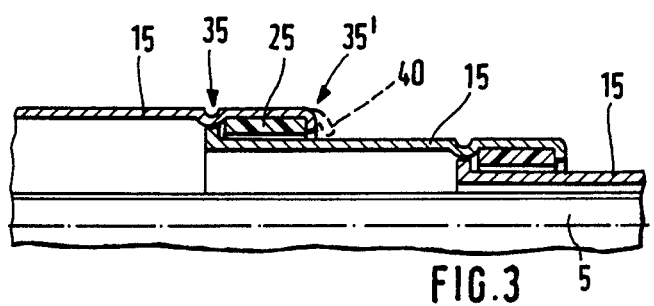
FIG. 3 shows a further embodiment of the protective device in accordance with the invention in a view similar to that of FIG. 2.

The design of the embodiment shown in FIG. 3 is generally the same as that of FIG. 2 although in this case the respective radial projections 35 and 35' do not have any guiding function. The guiding action is in fact performed by a guide bushing, which is again fixedly secured between the two radial projections 35 and 35' additionally in the axial direction. The one radial projection 35 is again formed by a groove so that this device ensures an optimum guiding action over a large surface area with an extremely high degree of resistance to flexure.

In the working example of FIG. 3 it would be possible to dispense with the groove radial projection 35 for simplicity.

There is also the possibility of providing the individual guard sections with a number of embossed structures or grooves or the like on the outer periphery in order to increase stiffness still further, although it is not permissible to impair the sliding action.

Figure 5:
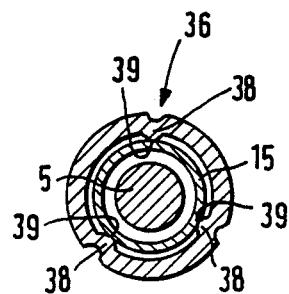
FIG. 5 is a cross section through a further working example of the protective device in a view similar to the cross section IV—IV of FIG. 2.

In the design of FIG. 5 in place of annular radial projections there are hump-like or punctuate radial projections 38, which are peripherally spaced out on the overlapping part of each respective guard section 15 and have a radially inwardly extending part 39 to guide the inner guard section 15 on its outer periphery with a sliding fit. These guiding parts 38 may also serve at the same time as an abutment with the function as described above. It is also possible for them to be used only as an abutment in which case the would not engage the outer wall of the inner guard section and additional guide devices would be needed.

It will be clear that in the case of the separate telescoping guard sections the abutment and guiding devices may also be present in a reversed arrangement so that the part on the respectively outer guard section will be on the inner one instead and vice versa.

Owing to the relatively high degree of stiffness of the protective device it is possible for the separate guard sections to be made with a relatively thin wall and thicknesses of about 0.8 mm are free of any trouble. Furthermore when the working member is retracted, that is to way at zero stroke, there is only a small axial extent of the protective device, this increasing compactness. It is also an advantage that the guide devices and/or the abutment and entraining devices prevent the entry of dirt. In addition, It is also possible to have further elastic wiping garters on the end parts of the guard sections if required, as is indicated in broken lines in FIG. 3 at 40. A further useful effect is the low resistance to sliding so that the normal functions of the protected device are not interfered with.

I claim:

1. A protective device for a piston rod of a piston and cylinder actuator, the piston rod being arranged at least partly in the cylinder and is able to be moved such that a portion of the piston rod projects to a greater or lesser extent out of the cylinder, comprising a plurality of separate sleeve-like guard sections which surround the piston rod along a desired length of the portion of the piston rod projecting out of the cylinder so that whatever the position of the piston rod any two adjacent guard sections overlap each other and slide in relation to each other, one of said guard sections being stationarily connected to the cylinder and another guard section being arranged on the piston rod so as to move therewith so that in accordance with the actual axial extent of the part of the piston rod to be protected adjacent sections are telescoped into each other to a greater or lesser extent, the individual sections having a cylindrical tubular form, the axial end part of at least one guard section at a cooperating pair of guard sections being able to telescope and having a guide device for a guided relative sliding action between the pair of guard sections, the guide device being formed by a tubular cylindrical bushing arranged on the axial end part of one of the pair of overlapping guard sections and having one radial peripheral surface forming a guide surface for guiding the sliding action of another guard section of the pair of overlapping guard sections.

2. The device as claimed in claim 1 wherein the dimensions measured in a direction across the direction of motion of the working member, of the separate guard sections in at least the respectively overlapping part in the drawn out condition with less overlap are stepped so that the transverse dimensions decrease from one guard section to the next guard section.

3. The device as claimed in claim 1 wherein the dimensions measured across the direction of motion decrease from one guard section to the next one starting with the guard section fixed to the receiving member so that at the maximum length of the part to be protected there is a graduation, more especially in the form of a stepped pyramid.

4. The device as claimed in claim 1 wherein the guide device is arranged on the respective outer guard section externally surrounding the inner one and overlapping it in the direction of motion.

5. The device as claimed in claim 1, wherein the guiding bushing is arranged on the inner periphery of the respectively outer guard section of a respective cooperating pair of guard sections and surrounds the inner guard section with its inwardly directed peripheral surface with a sliding fit.

6. The device as claimed in claim 5, wherein the guide bushing is bonded of the guard section carrying it.

7. The device as claimed in claim 1 wherein the guide device is made of plastic material.

8. The device as claimed in claim 1 wherein the guide device has at least two guide parts offset in the axial direction in relation to each other and which are arranged on the overlapping part of at least one guard section of a respective cooperating pair of guard sections and engage the other guard section with a running fit.

9. The device as claimed in claim 8 wherein the guide parts have the form of annular radial projections surrounding the other guard section.

10. The device as claimed in claim 1 wherein the abutment on the one guard section is formed by a peripherally extending radial projection more particularly in the form of an outwardly bent axial end part.

11. The device as claimed in claim 1 wherein at least the abutment of the one guard section of a cooperating pair of guard sections is formed by the guide device and in this respect is more especially formed by the guide bushing or a guide part.

12. The device as claimed in claim 1 wherein the individual guard sections have generally the same length and in the inwardly moved position of the working member are completely inserted into each other so that the length of the protective device in this case is essentially equal to the length of one guard section.

13. A protective device for a piston rod and cylinder actuator, the piston being arranged at least partly in a receiving member for movement along a path, said piston rod having a portion projecting to a greater or lesser extent out of the receiving member, a plurality of sleeve-like guard sections surrounding the piston rod portion projecting out of the cylinder each adjacent guard section of the plurality of guard sections overlapping each other and slidable in relation to each other, one of said guard sections being stationarily arranged on the cylinder and another guard section being arranged on the piston rod so as to move with said piston rod, said plurality of guard members telescoping in accordance with the actual axial extent of the piston rod, a plurality of hump-like or dot-like radial projections provided as guide parts arranged spaced out in the peripheral direction on the overlapping part of one guard section of a cooperating pair of guard sections.

14. A protective device for a piston rod and cylinder actuator, the piston being arranged at least partly in a receiving member for movement along a path, said piston rod having a portion projecting to a greater or lesser extent out of the receiving member, a plurality of sleeve-like guard sections surrounding the piston rod portion projecting out of the cylinder each adjacent guard section of the plurality of guard sections overlapping each other and slidable in relation to each other, one of said guard sections being stationarily arranged on the cylinder and another guard section being arranged on the piston rod so as to move with said piston rod, said plurality of guard members telescoping in accordance with the actual axial extent of the piston rod, the guide parts being formed by grooved embossed structures.

15. A protective device for a piston rod and cylinder actuator, the piston being arranged at least partly in a receiving member for movement along a path, said piston rod having a portion projecting to a greater or lesser extent out of the receiving member, a plurality of sleeve-like guard sections surrounding the piston rod portion projecting out of the cylinder each adjacent guard section of the plurality of guard sections overlapping each other and slidable in relation to each other, one of said guard sections being stationarily arranged on the cylinder and another guard section being arranged on the piston rod so as to move with said piston rod, said plurality of guard members telescoping in accordance with the actual axial extent of the piston rod, the guide parts being formed by embossed structures and more particularly grooves.

* * * * *